United States Patent [19]

Welch

[11] 3,876,981

[45] Apr. 8, 1975

[54] METHOD AND SYSTEM FOR COMBINING MAGNETICALLY AND OPTICALLY DERIVED SIGNALS TO RECOGNIZE CHARACTERS

[75] Inventor: Rolland E. Welch, Fairfax, Va.

[73] Assignee: Optical Recognition Systems, Inc., Reston, Va.

[22] Filed: Aug. 28, 1973

[21] Appl. No.: 392,399

[52] U.S. Cl. ................ 340/146.3 D; 340/146.3 ED; 235/61.11 E

[51] Int. Cl. ............................................. G06k 9/00

[58] Field of Search ........... 340/146.3 ED, 146.3 D; 235/61.11 E, 61.11 D, 61.7 R

[56] References Cited

UNITED STATES PATENTS

| | | | |
|---|---|---|---|
| 3,092,402 | 6/1963 | Reed | 235/61.11 E |
| 3,560,718 | 2/1971 | Spanjersberg | 235/61.7 R |
| 3,612,835 | 10/1971 | Andrews et al. | 235/61.11 D |
| 3,764,978 | 10/1973 | Tyburski et al. | 340/146.3 D |
| 3,764,980 | 10/1973 | Dansac et al. | 340/146.3 ED |

*Primary Examiner*—Gareth D. Shaw
*Assistant Examiner*—Leo H. Boudreau
*Attorney, Agent, or Firm*—Browne, Beveridge, Degrandi & Kline

[57] ABSTRACT

A character recognition system and method for recognizing characters printed in magnetic ink in which recognition is enhanced by sensing the characters with both magnetic and optical transducers. At least a signal derived from the magnetic transducer output signal is combined with at least a signal derived from the optical transducer output signal either at or prior to the recognition stage.

21 Claims, 20 Drawing Figures

METHOD AND SYSTEM FOR COMBINING MAGNETICALLY AND OPTICALLY DERIVED SIGNALS TO RECOGNIZE CHARACTERS

Copending U.S. application No. 249,643, filed May 2, 1972, now U.S. Pat. No. 3,764,978 assigned to the same assignee as the present application is incorporated herein by reference. Both the invention disclosed in U.S. Pat. application No. 249,643 and the present invention are based on the discovery that it is possible to enhance the character recognition process by combining the properties of magnetic recognition and optical recognition into a single recognition system, instead of utilizing exclusively a magnetic recognition system or exclusively an optical recognition system as was done in the prior art. While the invention described in above-mentioned U.S. Pat. application No. 249,643 combines the magnetically and optically derived signals after complete and independent magnetic and optical recognition processes have taken place the present invention relates to a method and system for combining the signals of magnetic and optical recognition systems prior to the point where both a complete magnetic recognition and complete optical recognition have taken place. Because there are certain capabilities possessed by magnetic recognition systems which optical recognition systems do not have and vice versa, in combining the two systems it is possible to draw on the strong points of both and thus enhance overall recognition capability over that which would be obtained with solely an optical or solely a magnetic system. It is thus an object of the invention to provide a method and system of character recognition which combines both magnetic recognition and optical recognition. It is a further object of the invention to provide a method and system of character recognition in which magnetically derived and optically derived signals are combined before both a complete magnetic recognition and a complete optical recognition have taken place.

A better understanding of the invention may be had by referring to the description below, taken in conjunction with the drawings in which.

Figure 8A:
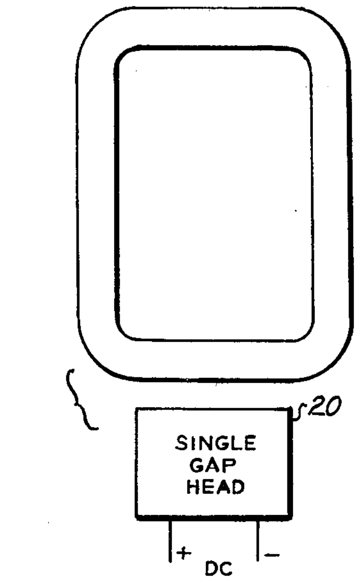

FIG. 8*a* shows the character O in the E13B font and a magnetic reading head.

Figure 8B:
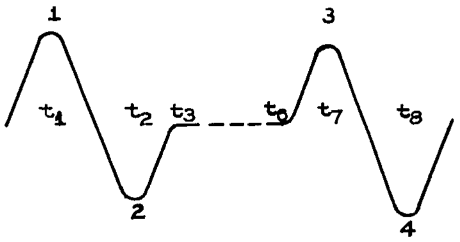

FIG. 8*b* shows a waveform generated by scanning the character shown in FIG. 8*a* after magnetization with a D.C. energized magnetizing head.

Figure 8C:
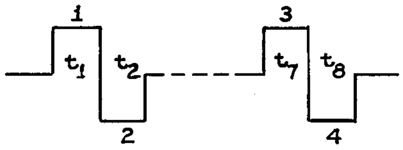

FIG. 8*c* shows the waveform in FIG. 8*a* after it has been quantized.

Figure 9:
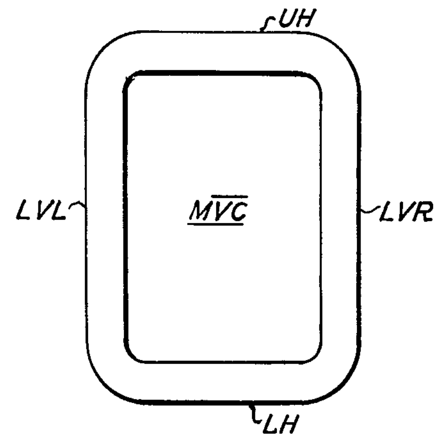

FIG. 9 shows the character O in the E13B font marked with stroke designations.

Figure 10:
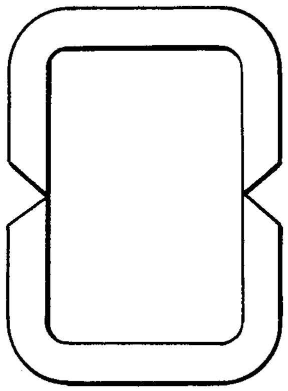

FIG. 10 shows an O in the E13B font having a defect therein.

Figure 11:
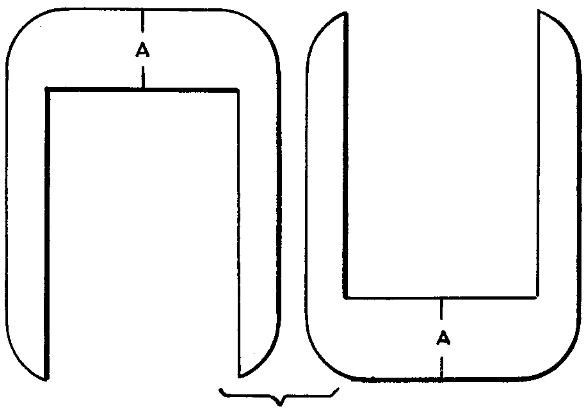

FIG. 11 shows two characters having the same flux distribution in the horizontal direction as in E13B O.

Figure 12:
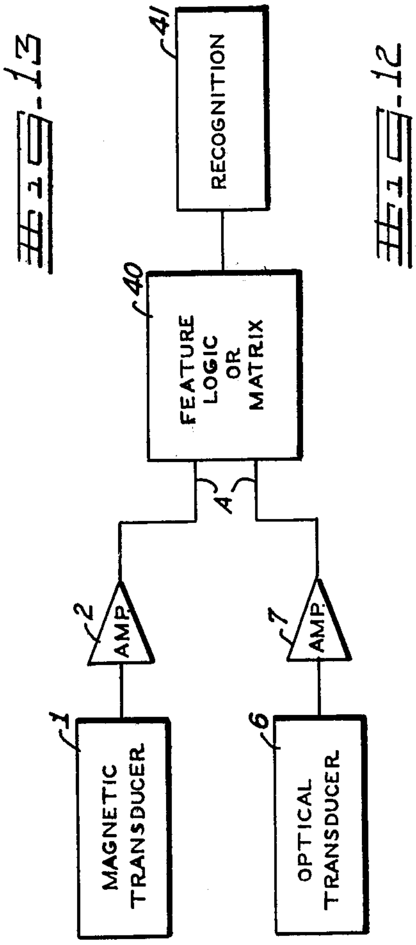

FIG. 12 shows a combined magnetic-optical recognition system wherein the magnetically derived and optically derived signals are combined prior to the recognition stage.

Figure 13:
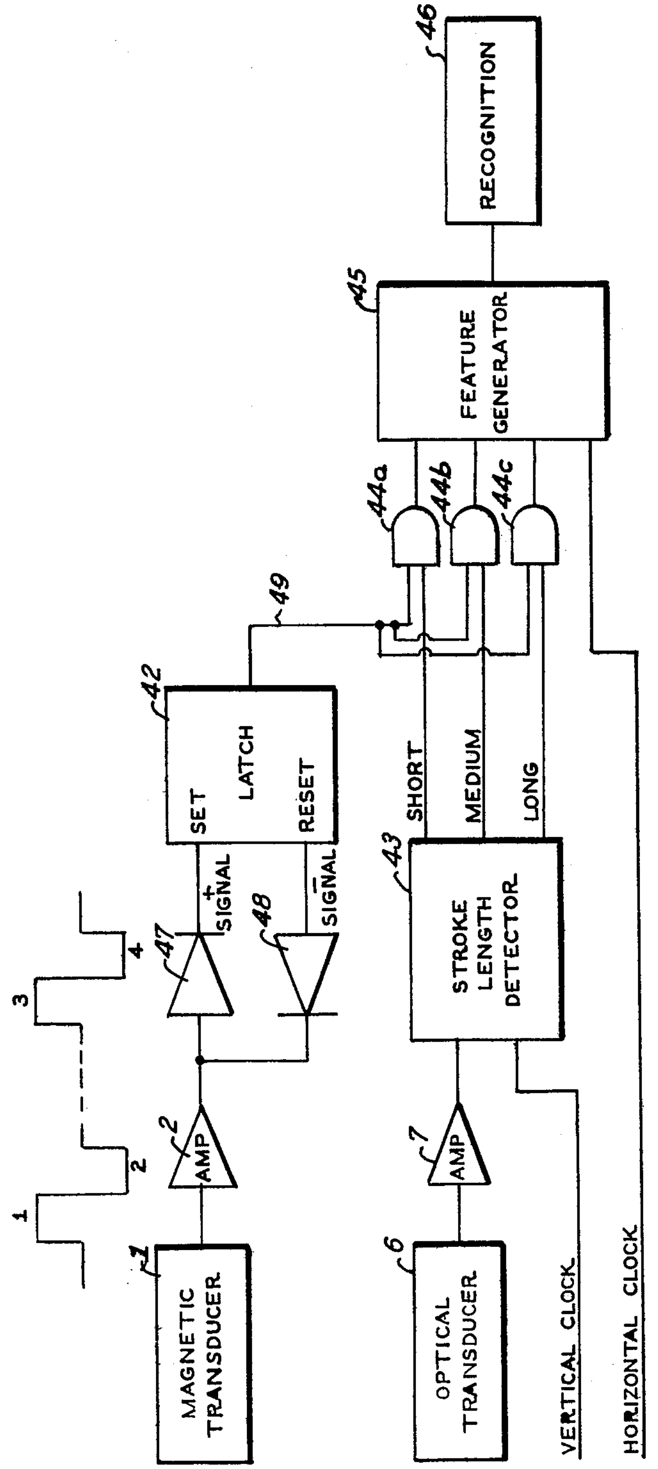

FIG. 13 shows an exemplary embodiment of the system shown in FIG. 12.

Figure 14:
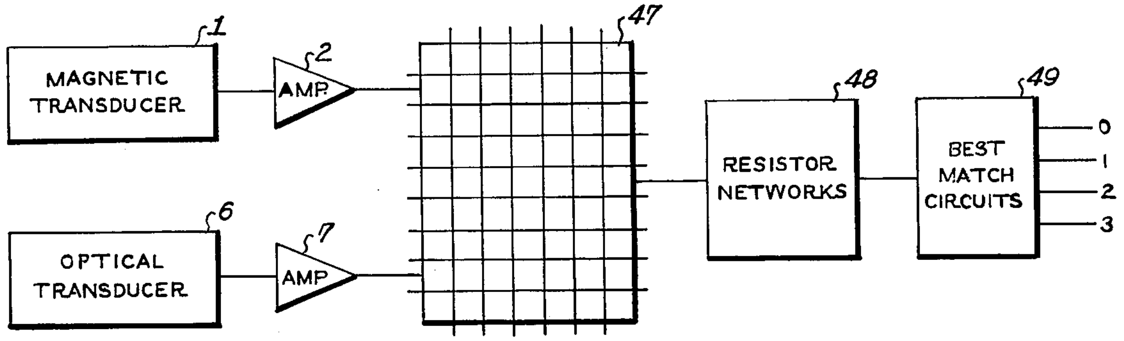

FIG. 14 shows an embodiment of the system shown in FIG. 12.

Figure 15:
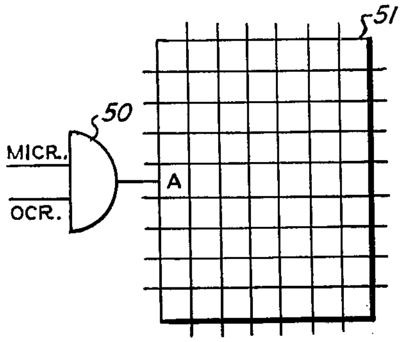
Figure 16:
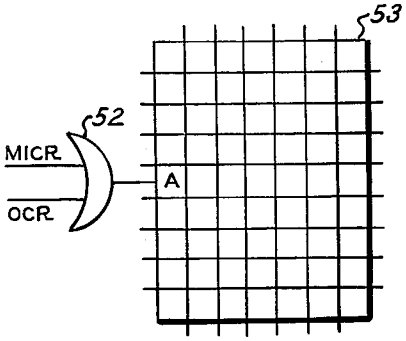
Figure 17:
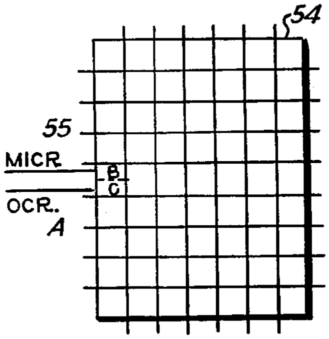

FIG. 15, 16 and 17 show exemplary embodiments of the system shown in FIG. 14.

Figure 18:
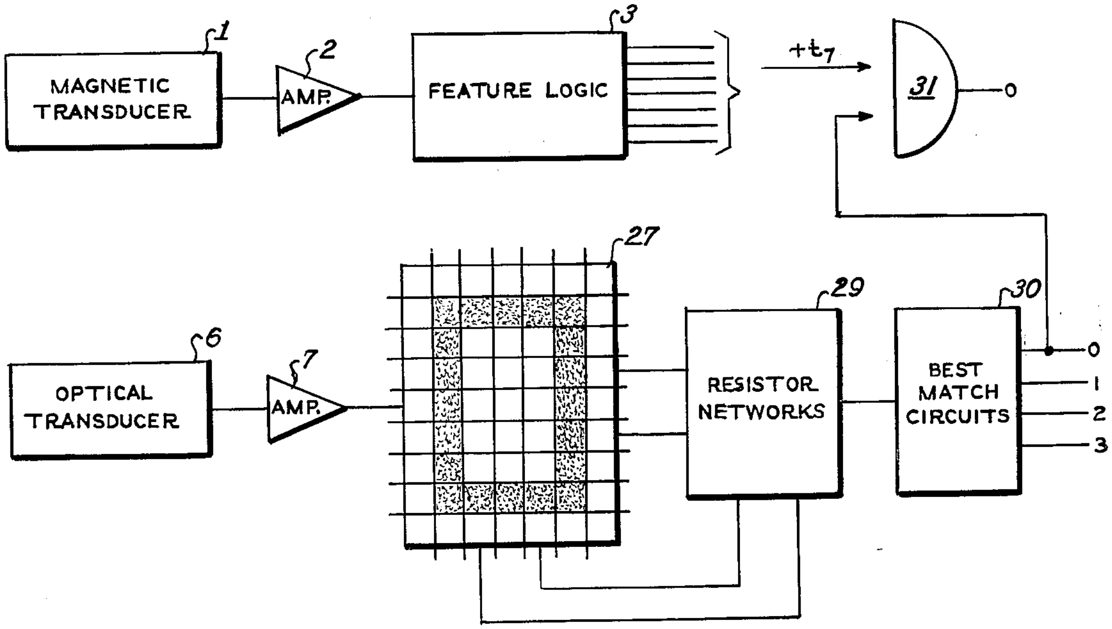

FIG. 18 shows a combined magnetic-optical recognition system wherein the magnetically derived and optically derived signals are combined at different points in the magnetic and optical recognition processes.

Figure 1:
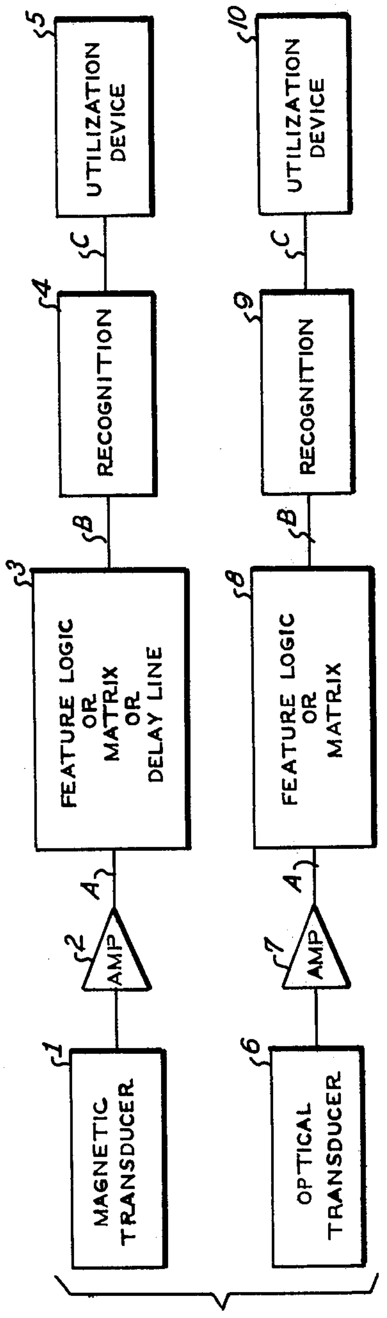
FIG. 1 is a generalized block diagram of a magnetic recognition system and an optical recognition system.

FIG. 1 shows a generalized prior art, magnetic character recognition system comprised of magnetic transducer 1, amplifier 2, feature logic or matrix or delay line means 3, recognition means 4 and a utilization device 5 which may be magnetic tape, a printer, or other utilization device known to those in the art. Also shown in FIG. 1 is a generalized, prior art, optical character recognition system which is comprised of optical transducer 6, amplifier 7, feature logic or matrix means 8, recognition means 9, and utilization device 10. The function of the blocks of the known optical and magnetic recognition systems will be described below but for the present it is noted that the systems of FIG. 1 are depicted in generalized form because the teachings of the present invention do not depend on the particular type of optical or magnetic recognition process utilized, but rather can be used in conjunction with any type of optical recognition system and any type of magnetic recognition system.

Figure 2:
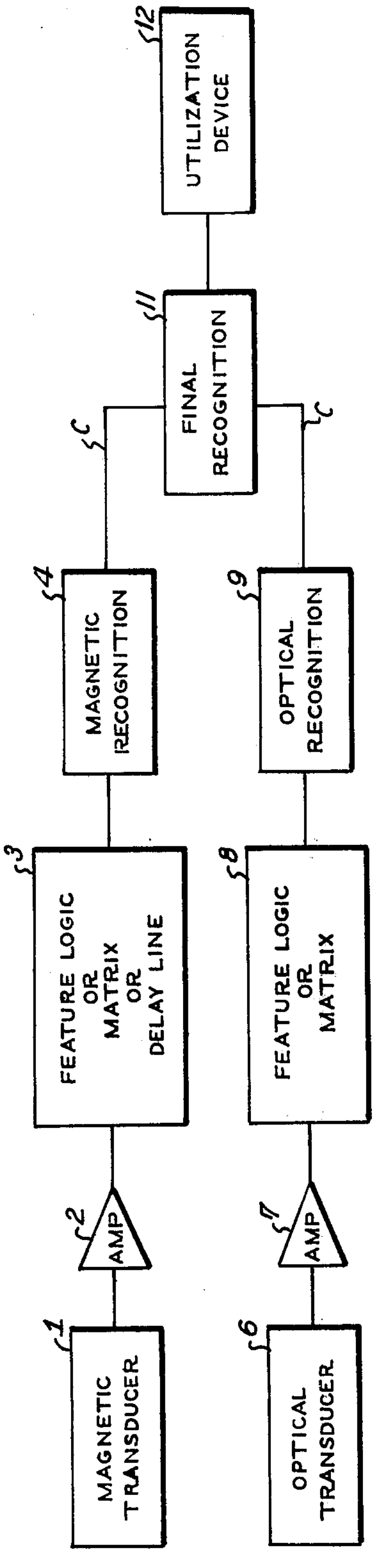
FIG. 2 is a combined magnetic-optical recognition system illustrative of the embodiment disclosed in copending U.S. Pat. application No. 249,643.

In co-pending U.S. Pat. Application No. 249,643 filed Mar. 2, 1972, incorporated herein by reference, an embodiment is disclosed which is shown illustratively in FIG. 2 of the present application. In this embodiment, a character recognition system is provided which combines a magnetic recognition process and an optical recognition process. More particularly, as shown in FIG. 2, the outputs of magnetic recognition network 4 and optical recognition network 9 are fed to network 11 which develops a final recognition signal on the basis of both the magnetic and optical signals fed thereto. Referring to FIG. 1, the embodiment disclosed in the aforementioned patent application thus combines the magnetically and optically derived signals at points C in the respective recognition systems. The present invention recognizes that it is also possible to combine the magnetically and optically derived signals before complete and separate magnetic and optical recognitions have taken place, such as for instance at the recognition stage itself (point B in FIG. 1) or at the feature generating or matrix stage (point A in FIG. 1).

Figure 3:
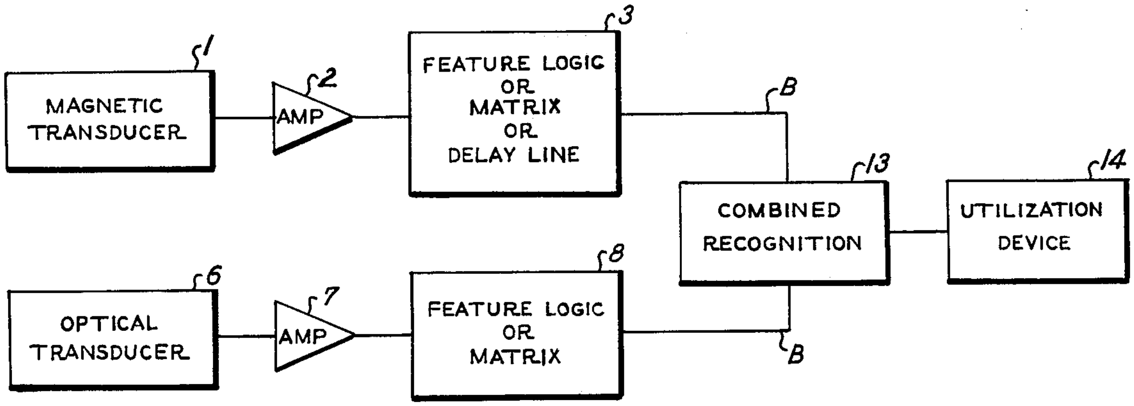
FIG. 3 shows a combined magnetic-optical recognition system wherein the magnetically and optically derived signals are combined at the recognition stage.
Figure 4:
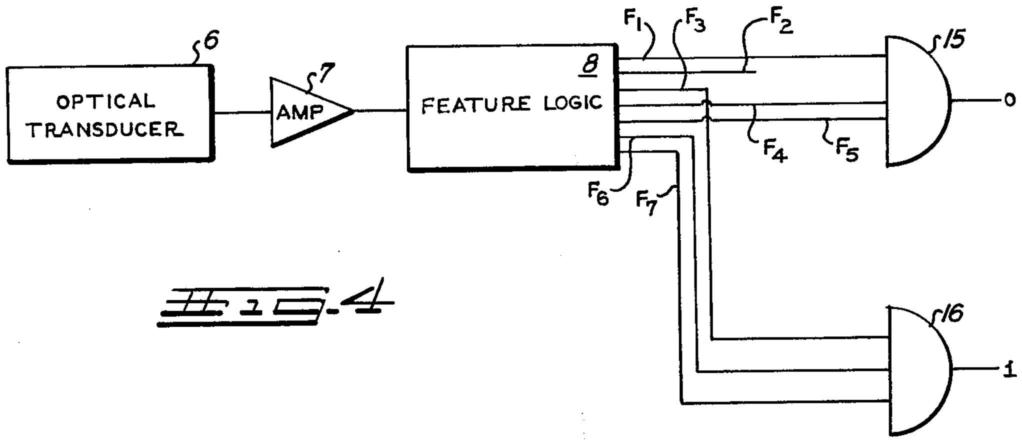
FIG. 4 shows a prior art type of optical recognition system.

FIG. 3 illustrates in block diagram form a recognition system in which the magnetic and optical systems are combined at points B. In order to understand the way in which the magnetic and optical signals may be combined in FIG. 3, FIG. 4, which is a more detailed diagram of a prior art type of optical recognition system is referred to. In the system of FIG. 4, optical transducer 6 scans the characters to be recognized and develops a video signal output corresponding thereto.

The optical transducer 6 is the system of FIG. 4 as well as in all other optical systems described in the specification may be any known type of optical transducer such as a photocell, plurality of photocells, photomultiplier tube or other transducer means known to those skilled in the art and the method of scanning further may be by any method known to those skilled in the art. The video signal which is normally of a relatively small magnitude is fed to amplifier 7 for suitable amplification. In the typical case, amplifier 7 would be preceded by, followed by, or incorporate a quantizing stage to distinguish between signals indicative of black and white. The output of amplifier 7 is fed to feature logic network 8 which develops a number of feature signals shown illustratively as $F_1$ to $F_7$ in FIG. 4 which correspond to the possible features of the group of characters being recognized. While seven features are shown for ease of illustration in FIG. 4 it is to be understood that in actual character recognition system the number of features may be fewer or greater. Additionally, it is to be understood that a feature is merely a property of a character, and that there are many schemes of character features and methods of generation thereof known to those skilled in the art and that any feature scheme and method of generation thereof may be used in conjunction with the present invention. One such suitable feature scheme utilizes the lengths and relative positions of the strokes of the characters as features and is disclosed in U.S. Pat. No. 3,523,280 which is incorporated herein by reference. The signals corresponding to the features $F_1$ to $F_7$ in FIG. 4 are selectively fed to AND recognition gates 15 and 16 which are similar to the AND gate shown in FIG. 16 of U.S. Pat. No. 3,523,280. In FIG. 4, gates 15 and 16 are indicative of the characters 0 and 1 respectively and a gate generates an output signal when its feature recognition criteria is met. For instance, it is necessary that the character being recognized have features $F_1$, $F_4$ and $F_5$ to be identified as O and that it have features $F_3$, $F_6$ and $F_7$ to be identified as 1. Signals indicative of the absence of a feature as well as of its presence may be part of the signal recognition criteria and may also be fed to the AND gates. While only two AND gates are shown in FIG. 4, it is to be understood that in an actual system, the number of AND gates will typically be equal to the number of characters being recognized. Further since the feature signals are ordinarily provided to the recognition gates at different times typically an actual recognition system includes a means for sampling all of the gates at the same time.

Figure 5:
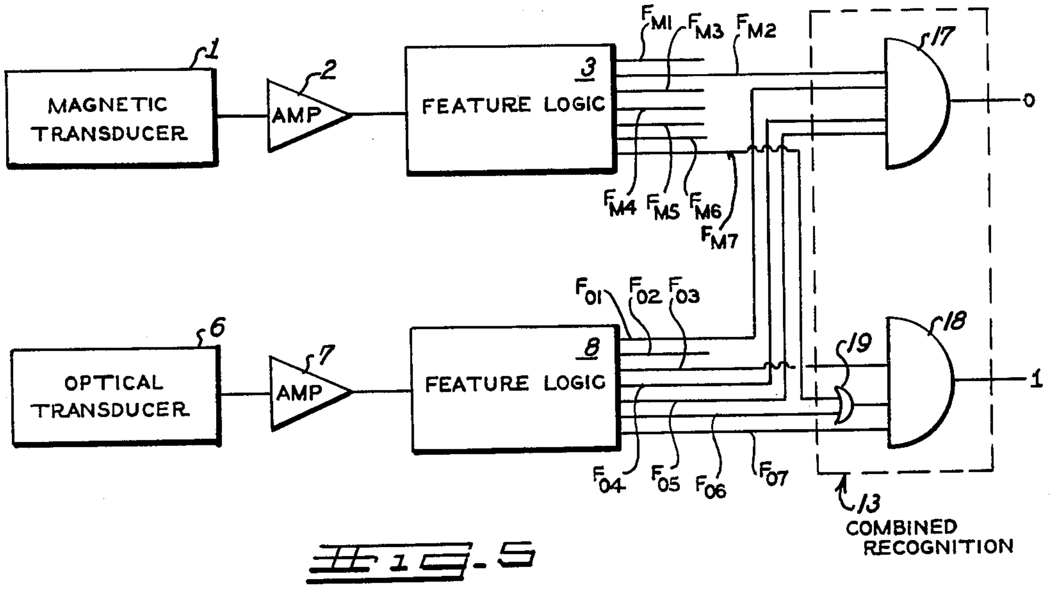
FIG. 5 shows an embodiment of the system shown at FIG. 3.

FIG. 5 shows an embodiment of the combined magnetic optical system of FIG. 3. In the system of FIG. 5, optical transducer 6, amplifier 7 and feature logic network 8 are identical to the components described in conjunction with FIG. 4 with feature logic 8 generating features denoted as $F_{01}$ to $F_{07}$. The magnetic system includes magnetic transducer 1, which typically may be a D.C. or A.C. energized single gap magnetic read head or other magnetic transducer known to those skilled in the art, amplifier 2, which may incorporate or be followed or preceded by a quantizer and feature logic network 3, which generates feature signals FM1 to FM7 which, as in the case of the optically generated features may be any set of features derived from the transducer signal which are useful in identifying the characters being recognized. One set of such features and a technique for generation thereof is disclosed in U.S. Pat. No. 3,114,131 which is incorporated herein by reference and another set of such features and the technique for generation thereof is disclosed in co-pending U.S. Pat. application No. 322,809 filed Jan. 11, 1973 incorporated herein by reference and assigned to the assignee of the present application. In the combined system of FIG. 5 as in the solely optical system of FIG. 4, optically generated features $F_{01}$, $F_{04}$ and $F_{05}$ are fed to AND gate 17 but in the system of FIG. 5, magnetically derived feature signal FM2 is also fed to AND gate 17. This, for instance, might be done in a case where the optical system might be weak in detecting the part of the character resulting in feature signal FM2 or for any other reason making it desirable to enhance the optical recognition criteria by the additional requirement of the presence of FM2. When an additional feature such as FM2 is AND gated with the optical features, the recognition criteria is tightened and the system is more selective in identifying characters. Instead of tightening recognition by the addition of magnetic feature signals to an optical system or vice versa it may be desirable to enhance the recognition in a way which has the effect of loosening the recognition criteria. This may be accomplished by OR gating optically and magnetically derived feature signals together with the output of the OR gate being fed to the recognition AND gate. Such an arrangement is shown at OR gate 19 in FIG. 5 where magnetically derived feature FM7 is OR gated with the optically derived feature $F_{06}$, the output of OR gate 19 being fed to AND gate 18.

It is to be understood that the way in which the optically and magnetically derived feature signals are combined at the recognition gates will vary with the individual recognition situation, the particular group of characters being recognized, the feature scheme used and the desired results. For instance, while the embodiment shown in FIG. 5 utilizes more optical features for recognition than magnetic features, if desired more magnetic features than optical features or an equal number of magnetic and optical features may be used for recognition. Likewise, while the emobdiment of FIG. 5 shows magnetic feature signals AND gated at one recognition gate and OR gated at the other any combination of OR and AND gating at a single recognition gate may be used.

Figure 6:
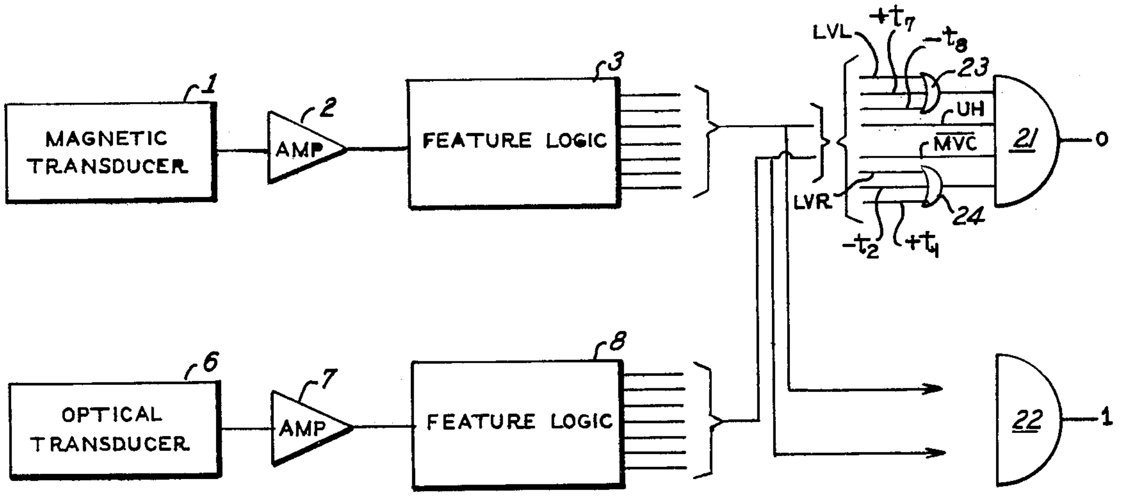
FIG. 6 shows an exemplary embodiment of the system shown in FIG. 5.
Figure 7:
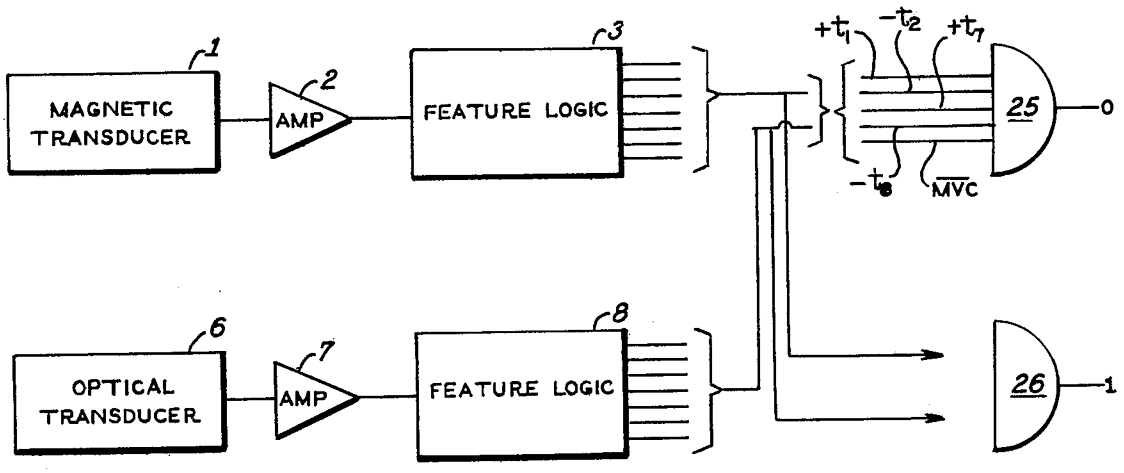
FIG. 7 shows a further exemplary embodiment of the system shown in FIG. 5.

While the present invention is not limited to any particular combination of magnetically and optically derived signals at the recognition gates, in order to illustrate how the principles of the invention may be used in an actual recognition situation the exemplary embodiments of FIGS. 6 and 7 are provided. As it is necessary to describe an exemplary embodiment in conjunction with specific types of optical and magnetic recognition systems to illustrate specific combinational possibilities of specific feature signals before referring to FIGS. 6 and 7 the specific types of recognition systems used for purposes of illustration are described in conjunction with FIGS. 8 and 9. Referring to FIG. 9, the character O in the E13B font is shown. One possible scheme of features which can be utilized in conjunction with the character of FIG. 9 are the stroke lengths and relative positions and such a scheme is disclosed in the abovementioned U.S. Pat. No. 3,523,280 which is incorporated herein by reference. A similar scheme is disclosed in U.S. Pat. No. 3,465,288 which is also incorporated by reference herein. Thus, according to the feature scheme disclosed in the above-mentioned patents the character O would be recognized by an indication of the presence of the following features: long vertical left stroke, (LVL), long vertical right stroke (LVR), upper horizontal stroke (UH), lower horizontal stroke (LH), and an indication of the absence of a medium vertical center stroke ($\overline{MVC}$). The same features as well as possibly others would be used in conjunction with the recognition of the other characters of the font.

The specific type of magnetic recognition system illustratively utilized in FIGS. 6 and 7 is described in conjunction with FIGS. 8*a*, 8*b* and 8*c*. FIG. 8*a* shows an O in the E13B font adjacent to a D.C. energized single gap magnetic read head. As known to those skilled in the art, such a read head produces an output signal which is proportional to the time rate of change of magnetic flux passing under it. If the E13B O shown in FIG. 8*a* were therefore printed in magnetic ink and magnetized prior to passing it under read head 20, the waveform shown in FIG. 8*b* would result. The E13B font of characters is designed so that peaks in the transducer waveform can occur only at one of eight possible relative times which are known if the rate of travel of the character is known. In FIG. 8*b*, it is seen that positive peaks 1 and 3 occur at times *t*1 and *t*7 and negative peaks 2 and 4 occur at times *t*2 and *t*8. The characters of the font are designed so that a unique waveform is generated for each of the characters in the font which waveforms may then be recognized by a waveform recognition apparatus. One such waveform recognition apparatus, disclosed in U.S. Pat. No. 3,114,131 incorporated herein by reference, recognizes the waveforms by detecting features indicative of the polarity and relative time of occurrence of the peaks of the waveform. Thus, the waveform shown in FIG. 8*b* is first quantitized at the levels shown by the dotted lines in FIGS. 8*b* resulting in the waveform shown in FIG. 8*c*. The feature signals derived from the waveform of FIG. 8*c* are signals corresponding to a positive pulse at time *t*1, a negative pulse at time *t*2, a positive pulse at time *t*7 and a negative pulse at time *t*8. These feature signals could be imputted to an appropriate AND recognition gate to indicate that an E13B O has passed under the read head. An alternative feature generation scheme is disclosed in co-pending U.S. Pat. application No. 322,809 filed Jan. 11, 1973, assigned to the Assignee of the present application and incorporated herein by reference. The single gap magnetic head 20 shown in FIG. 8*a* could be AC energized as well as DC energized in which case the resulting waveform would be proportional to the total amount of flux passing under the head at any time and appropriate recognition circuitry known to those skilled in the art could be used to recognize the characters in such a system.

When the specific magnetic and optical recognition systems described in conjunction with FIGS. 8 and 9 are utilized in the combined illustrative system of FIG. 6, feature logic network 3 generates the feature signals +*t*1, –*t*2, +*t*7, –*t*8 in response to the passage of an E13B O and optical feature logic network 8 generates the feature signals LVL, LVR, UH and $\overline{MVC}$. If there were only an optical recognition system in FIG. 6, then the feature signals LVL, UH, $\overline{MVC}$ and LVR would be fed from feature logic network 8 and AND gate 21 and if all these signals were present when the gate was sampled it would produce an output signal indicating that a O had been recognized. (A bar over a feature signal, e.g. $\overline{MVC}$, indicates absence of medium vertical center stroke). If, however, the O being processed were not a perfect O but rather was defective in the way shown in FIG. 10, then the optical system by itself might not recognize the character as a zero. This is because due to the broken left and right strokes, no LVL or LVR signal would be generated, but rather in place of the LVL signal two medium vertical left or MVL signals would be generated and instead of the LVR signal, two medium vertical right or MVR signals would be generated and the recognition criteria of gate 21 would not be met. While the optically derived feature signals would thus change as a result of the defects shown in FIG. 12 the magnetically derived feature signals would not be affected by the defects. This is because the magnetic recognition system in the case of a DC energized head responds only to the total rate of change of flux passing under the head, and in the case of an AC energized head responds to the total flux passing under the head. While peaks 1, 2, 3 and 4 in FIG. 10*b* would be slightly smaller because of the defects (the corresponding points in the A.C. derived waveform would also be of slightly smaller amplitude) the quantizing levels are set low enough so that the resulting feature signal of FIG. 10*c* would be the same as with a perfect O. Hence, the optical recognition criteria can be enhanced by OR gating the magnetically derived +*t*1 and –*t*2 signals with the optically derived LVR feature signal (magnetic scanning in the case if E13B characters being from right to left) and the +*t*7 and –*t*8 magnetically derived feature signals with the LVL optically derived signal. The outputs of OR gates 24 and 23 would be connected to recognition gate 21. Hence, in the embodiment shown in FIG. 6, either an optically detected long vertical right stroke or a magnetically derived positive pulse present at time *t*1, or a magnetically derived negative pulse present at time *t*2 will serve to indicate that a long vertical right stroke is present in the character. Likewise, either an optically detected long vertical left stroke or a magnetically derived positive pulse present at time *t*7 or a magnetically derived negative pulse present at time *t*8 will indicate that a long vertical left stroke is present. It may further be desired depending on the individual situation to AND gate the +*t*1 and –*t*2 signals together, and connect the output of the AND gate or OR gate 24 in order to make the recognition criteria somewhat tighter.

Another example of the way in which the principles of the invention may be utilized is shown in FIG. 7, wherein primarily a magnetic recognition system is enhanced by the addition of optical feature signals. Blocks 1 to 3 and 6 to 8 are the same as described in conjunction with FIG. 6. If FIG. 7 were solely a magnetic recognition system, the feature signals +*t*1, –*t*2, +*t*7, –*t*8 as shown would be fed to AND gate 25. A characteristic of the type of magnetic recognition systems described above, however, is that they are unable to detect the presence of horizontal strokes, being responsive only to the rate of change of flux. In FIG. 11 an inverted U-shaped character and a U-shaped character having a horizontal portion A are shown. A.D.C. energized magnetic head will generate the same waveform when the characters in FIG. 11 pass by it as when the O shown in FIG. 8*a* passes by and an A.C. energized magnetic head will generate the same waveform if the portion A is twice as thick as the horizontal portion of the O. This is because in the D.C. system the rate of change of flux falls to zero when either the horizontal portions of the O or the portions A pass by the head and in the A.C. system the total value of flux across the horizontal portion A is the same as across the horizontal strokes of the O if the portion A is twice the width as a horizontal stroke of the O. Hence, with only magnetically derived signals fed thereto, recognition gate 25 might misrecognize either of the characters shown in FIG. 13 as an E13B O. In accordance with the embodiment of FIG. 7, however, the recognition process is enhanced by feeding an optically derived $\overline{MVC}$ input from optical feature logic network 8 and AND gate 25. The presence of this signal indicates that there is no medium vertical center stroke present as there would be in a case of the characters of FIG. 11 but would not be in the case of the O. Hence, the recognition criteria is strengthened by the use of both optical and magnetic feature signals.

The embodiments of FIGS. 6 and 7 thus illustrate the way in which magnetically and optically derived feature signals can be advantageously combined at the recognition gates. As previously stated, the embodiments illustrated in FIGS. 6 and 7 are illustrative only and other combinational possibilities will occur to those skilled in the art in particular character recognition situations.

While the embodiments of the basic system of FIG. 3 wherein the magnetically and optically derived signals are combined at the recognition stage have been illustrated in FIGS. 5 to 7 for the case where blocks 3 and 8 are feature logic networks the invention may also be utilized in the case where either or both of blocks 3 and 8 is a flip flop matrix or in the case where block 3 is a delay line. Matrix recognition systems are disclosed in U.S. Pat. No. 3,104,369 and 3,164,806, both of which are incorporated herein by reference. In the matrix type of system optically or magnetically derived signals indicative of the presence of the character at particular locations are loaded into corresponding locations of a flip flop matrix so that an electronic image of the character is formed in the matrix. Selected cells of the matrix are connected to a plurality of resistor networks equal in number to the number of characters to be recognized and the connections and resistors are arranged so that the output of the resistor network corresponding to the character being processed will have a higher or lower voltage than the other networks, which higher or lower voltage is detected by a best match detector circuit. In the delay line type of system a magnetic transducer waveform such as is shown in FIG. 8*b* is fed to a delay line having taps at positions corresponding to the possible peak positions of the waveform when the waveform is in a predetermined sampling position in the delay line. The taps are fed to the resistor networks and the network output having the lowest or highest voltage when sampled corresponds to the character recognized. A delay line type of system is described in U.S. Pat. No. 3,439,337 which is incorporated herein by reference. Thus according to the teachings of the present invention both blocks 3 and 8 in FIG. 3 can be flip flop matrices and the outputs of selected cells of the magnetic and optical matrices could be combined in a composite resistor network. As discussed above the particular mode of combination would vary depending on the individual recognition situation. In the alternative the delay line taps of a magnetic system could be combined with the cell outputs of an optical flip flop matrix or magentic system matrix cell outputs could be combined with optical feature network signals or vice versa.

According to a further embodiment of the invention referring to FIG. 1, it is also possible to combine the magnetic and optical character recognition systems at points A. Such a combined magnetic-optical recognition system is shown illustratively in FIG. 12. In the system shown in FIG. 12, the magnetically and optically derived signals are either combined in the formation of the feature signals or are combined when being inputted to a flip flop matrix in a matrix type of recognition system. Several illustrative arrangements of the system of FIG. 12 described in conjunction with FIGS. 13 to 17.

The embodiment of FIG. 13 illustrates how magnetically and optically derived signals can be combined to form feature signals. Since a magnetic recognition system such as described in conjunction with FIG. 8*a* cannot accurately measure vertical stroke length (the amplitide of the waveform excursions being due to flux change which can be due either to stroke length or ink density), while an optical system can, and since an optical system may respond to non-magnetic dirt or writing, whereas a magnetic system will not, the arrangement shown in FIG. 13 combines magnetically and optically derived signals to result in a composite system which accurately measures stroke length but which does not respond to non-magnetic dirt or writing. This is accomplished by allowing signals corresponding to optically detected vertical stroke lengths to be gated through to the remainder of the recognition system only when the magnetic part of the system indicates that a magnetic ink stroke is present.

Referring to FIG. 13 the output of optical transducer 6 is fed to amplifier 7 and the output of amplifier 7 is fed to stroke length detector 43. A vertical clock line having a plurality of clock pulses generated thereon during each vertical scan of the character is fed to another input of stroke length detector 43. Stroke length detector 43 is operative to emit an output signal on one of its three output lines depending on whether a short, medium or long stroke is detected. The details of stroke length detector 43 are known to those skilled in the art, and it may for instance be comprised of an AND gate, the output of which is fed to a counter having three output lines corresponding to different counts which are the short, medium or long output lines in FIG. 13, the video signal and the vertical clock line being fed to the inputs of the AND gate. If the magnetic system were not present in the embodiment of FIG. 13, the short, medium and long output lines would be fed to feature generator 45 along with a horizontal clock input on which timing pulses corresponding to horizontal position in the character is generated. Feature generator 45 is operative to output feature signals indicative of stroke length and horizontal position in the character. The details of a suitable feature generator 45 are known to those skilled in the art and would vary depending on the particular recognition application. The output of feature generator 45 is fed to recognition network 46 comprised of a series of AND recognition gates already discussed for indicating which of the characters is recognized. One disadvantage of the optical recognition system thus far described is that it may interpret a piece of dirt or writing at the character as a feature, and as a result either reject or mis-recognize the character.

The magnetic recognition system which is combined with the optical system may be of the type discussed in conjunction with FIGS. 8*a*, 8*b* and 8*c*. The occurrence of pulses 1 and 3 in FIGS. 8*c* indicates the beginning of the right and left vertical strokes of the O respectively and the occurrence of pulses 2 and 4 indicates the ending of the right and left vertical strokes respectively. The waveform shown in FIG. 8*c* is reproduced above the amplifier 2 in FIG. 13 and the amplifier which would include a quantizer would output a signal having this waveshape. This signal is fed to diode network 47, 48, the outputs of which are fed to the set and reset inputs of latch 42. Pulses 1 and 3 of the signal are thus operative to set latch 42 in response to the beginning of a vertical stroke while pulses 2 and 4 are operative to reset the latch in response to the termination of a vertical stroke. Thus, the presence of a signal on line 49 indicates that a vertical stroke printed in magnetic ink is present. Line 49 is fed to AND gates 44*a*, 44*b* and 44*c* which will pass the optically derived stroke length signals only when the magnetic recognition system indicates that a magnetically printed vertical stroke is present. Hence, only optical signals arising from magnetically imprinted strokes will be passed to feature generator 45 and signals arising from dirt or non-magnetic writing will not be passed.

FIGS. 14 to 17 show illustrative systems according to the embodiment of FIG. 12 in which block 40 comprises a matrix. The details of matrix type recognition systems have been discussed above and further are disclosed in U.S. Pat. Nos. 3,104,369 and 3,164,806, both of which are incorporated herein by reference. The way in which the system shown in FIG. 14 differs from a conventional matrix recognition system is that the inputs to the matrix instead of being exclusively optically derived or exclusively magnetically derived are both optically and magnetically derived by transducers 1 and 6 as known to those skilled in the art to provide the required signals for imputting to the matrix transducer 1 is most suitably a multi-track magnetic transducer. FIGS. 15 to 17 illustrate the different ways in which the optically and magnetically derived signals can be combined at the matrix. Referring to FIG. 15, the magnetically and optically derived signals are fed to AND gate 50, the output of which is connected a cell A of matrix 51. Hence, in this embodiment, a one-bit will be entered to cell A only in the case where both optical and magnetic scanning has indicated that ink is present at the position in the character corresponding to cell A. Similarly, all of the other cells used in the matrix may be filled in the same way as cell A. In the alternative, depending on the particular recognition situation, it may be desirable to only fill selected ones of the cells in the fashion illustrated in FIG. 15 and to fill the remainder with bits resulting from solely optical scanning or solely magnetic scanning. If all cells of the matrix are filled in accordance with the method shown in FIG. 15 the recognition system would be a redundant system and would provide extremely tight recognition.

The system shown in FIG. 16 provides a looser recognition than either a magnetic system or an optical system by itself. In FIG. 16, the magnetically and optically derived information signals are fed to OR gate 52, the output of which is fed to cell A of matrix 53. Hence, in this embodiment, either an optical signal or a magnetic signal indicative of the presence of the character at the character position corresponding to cell A is effective to input a one-bit to cell A.

FIG. 17 shows a third technique for addressing the matrix in which each cell is divided into two sub-cells, with each sub-cell being capable of assuming two states. Thus cell A in matrix 54 is divided into two sub-cells B and C. The magnetically derived information signal is fed to one of the sub-cells, while the optically derived information signal is fed to the other of the sub-cells. Cell A will thus be addressed with a O if neither the optical signal or the magnetic signal indicates character presence at a position corresponding to cell A, will be addressed with a single one-bit at sub-cell B if the magnetic signal indicates character presence and with a single one bit at sub-cell C if the optical signal indicates character presence, and will be addressed with two one-bits if both magnetic and optical signals indicate character presence. Thus, in this type of system, weight is attached to the fact that both the magnetic system and the optical system rather than only one of them indicate character presence.

It should be understood that the particular form of matrix addressing is subject to variance in individual recognition situations and that any combination of the methods shown in FIGS. 15, 16 and 17 may be utilized in conjunction with a single matrix. For each combination of magnetic and optical inputs as known to those skilled in the art, the values of the resistors, and the connections thereof in resistor network 48 are arranged to result in the desired recognition criteria.

In a further embodiment of the invention referring to FIG. 1 the magnetic and optical recognition systems may be combined at different points in the respective recognition processes. For instance, magnetically derived signals at point C could be combined with optically derived signals at points A or B, or vice versa, or magnetically derived signals at point B could be combined with optically derived signals at points A or C or vice versa, or magnetically derived signals at point A could be combined with optically derived signals at points B or C. FIG. 18 is illustrative of such a system in which point C of an optical system is combined with point B of a magnetic system. The optical system is of the matrix type described above and is comprised of transducer 6, amplifier 7, matrix 27, resistor networks 2*a* and best match circuits 30. The O output of network 30 is connected to AND gate 31. The magnetic recognition system may be the type described in conjunction with FIG. 8 and is comprised of magnetic transducers 1, amplifier 2, and feature logic network 3. The $+t7$ output line of feature logic network 3 has a signal appearing thereon if the magnetically derived signal shown in FIG. 8*c* has a positive pulse present at time $t7$, which pulse is present in the signal generated by an E13B O. AND gate 31 will thus produce an output signal indicating that a O has been recognized only if best match network 30 indicates that a O has been recognized and a magnetic feature signal indicative of a O is present. An arrangement such as is shown in FIG. 18 is especially useful in the case where network 30 indicates an ambiguity. For instance, both the 0 and 1 output lines of network 30 might generate output signals in which case the 0 and 1 lines would be fed to two AND gates, one having magnetically derived signals corresponding to a 0 fed thereto and the other having magnetically derived signals corresponding to a 1 fed thereto. Only the AND gate corresponding to the character actually being recognized will generate an output signal and hence the ambiguity is resolved.

While we have disclosed and described the preferred embodiments of our invention, we wish it understood that we do not intend to be restricted solely thereto, but that we do intend to include all embodiments thereof which would be apparent to one skilled in the art and which come within the spirit and scope of our invention.

What is claimed is:

1. A character recognition system for recognizing characters printed in magnetic ink comprising magnetic transducer means for generating at least a first transducer signal in response to the magnetic properties of each of said characters, optical transducer means for generating at least a second transducer signal in response to the optical properties of each of said characters, means for converting said at least a first transducer signal for each character to a first set of ditial feature signals for that character, means for converting said at least a second transducer signal for each character to a second set of digital feature signals for that character, and recognition means responsive to at least one feature signal from said first set of signals for each character and at least one feature signal from said second set of signals for the same character for providing an identification signal indicative of that character.

2. The system of claim 1 wherein said recognition means includes means for combining said at least one feature signal from said first set and said at least one feature signal from said second set.

3. The system of claim 1 wherein said recognition means includes AND gate means and wherein at least one feature signal from each of said sets or a signal derived from at least one feature signal from each of said sets is fed to said AND gate means.

4. The system of claim 3 wherein said recognition means further includes OR gate means and at least two of said feature signals are fed to said OR gate means.

5. The system of claim 4 wherein at least two of the total number of signals fed to said OR gate means are from different sets of said feature signals.

6. The system of claim 5 wherein the output of said OR gate means is fed to said AND gate means.

7. The system of claim 1 wherein the feature signals fed to said recognition means from at least one of said first and second sets of feature signals are insufficient by themselves to provide for positive identification of the character.

8. A character recognition system for recognizing characters printed in magnetic ink comprising magnetic transducer means for generating at least a first transducer signal in response to the magnetic properties of each of said characters, optical transducer means for generating at least a second transducer signal in response to the optical properties of each of said characters, means for converting said at least a first transducer signal for each character to first digital signals for each character, means for converting said at least a second transducer signal to second digital signals for each character, means for combining at least one of said first digital signals for each character with at least one of said second digital signals for the same character to produce at least a combined digital signal for that character, and recognition means responsive at least in part to said at least a combined signal or to signals derived from said at least a combined signal for producing an identification signal for each character.

9. The system of claim 8 wherein said characters to be recognized include vertical strokes and wherein said first digital signals indicate whether or not a vertical stroke is present.

10. The system of claim 8 wherein said second digital signals are indicative of the length of the strokes of said characters.

11. The system of claim 8 wherein said means for combining includes AND gate means.

12. The system of claim 8 further including feature signal generating means responsive to said at least a combined signal for producing said signals derived from said at least a combined signal.

13. The system of claim 12 wherein said feature signal generating means is also responsive to timing signal generating means.

14. The system of claim 8 wherein said means for combining includes matrix storage means.

15. The system of claim 14 wherein said means for combining further includes means for imputting a one-bit to said matrix storage means only when one digital signal of said first digital signals for each character and one digital signal from said second digital signals both indicate that the same part of the character is present.

16. The system of claim 15 wherein said means for imputting includes AND gate means.

17. The system of claim 14 wherein said means for combining includes means for imputting a one-bit to said matrix storage means when either one digital signal of said first digital signals for each character or one digital signal from said second digital signals for each character indicates that a part of the character is present.

18. The system of claim 17 wherein said means for imputting includes OR gate means.

19. The system of claim 14 wherein said matrix storage means includes at least a cell which is arranged to store a one-bit when a digital signal of one of said first or second digital signals for each character indicates that a part of the character is present and to store an additional one-bit when a digital signal of the other of said first or second digital signals for each character indicates that the same part of the character is present.

20. A character recognition system for recognizing characters printed in magnetic ink comprising magnetic transducer means for generating a first transducer signal in response to the magnetic properties of each of said characters, optical transducer means for generating a second transducer signal in response to the optical properties of each of said characters, first converting means for converting each of said first transducer signals to a first set of digital feature signals, second converting means for converting each of said second transducer signals to a second set of digital signals, preliminary recognition means responsive to said second set of digital signals for providing a preliminary character identification signal and final recognition means responsive to said preliminary identification signal and to at least a feature signal from said first set of digital signals for providing a final character identification signal.

21. A method of character recognition for recognizing characters printed in magnetic ink comprising the steps of, generating at least a first transducer signal in response to the magnetic properties of each of said characters, generating at least a second transducer signal in response to the optical properties of each of said characters, converting each of said at least a first transducer signal to a first set of digital feature signals for each character, converting each of said at least a second transducer signal to a second set of digital feature signals for each character, and deriving an identification signal for each character in response to at least one digital signal from said first set of signals for each character and at least one digital signal from said second set of signals for the same character.

* * * * *